Aug. 27, 1957 R. H. PRICE ET AL Re. 24,350

DIAPHRAGM VALVES

Original Filed Aug. 5, 1949

INVENTORS
Richard Hector Price
& Oliver Kaye
BY
Young, Emery & Thompson
ATTORNEYS United States Patent Office Re. 24,350

Reissued Aug. 27, 1957

24,350

DIAPHRAGM VALVES

Richard Hector Price and Oliver Kaye, Cwmbran, Newport, England, assignors to Saunders Valve Company Limited, Cwmbran, Newport, England, a British company Original No. 2,705,124, dated March 29, 1955, Serial No. 108,676, August 5, 1949. Application for reissue November 1, 1955, Serial No. 544,388

4 Claims. (Cl. 251—266)

Matter enclosed in heavy brackets [ ] appears in the original patent but forms no part of this reissue specification; matter printed in italics indicates the additions made by reissue.

This invention relates to diaphragm valves for the control of fluids of the type in which the valve body has a straight-through bore (so permitting it to be rodded through) the diaphragm in the closed position of the valve being pressed against a seating formed the whole way across a transverse section of the valve body from one side of the clamped diaphragm margin to the other, by a correspondingly shaped actuator, while in the open position the actuator is retracted out of the valve bore and being attached to the diaphragm, draws the diaphragm with it away from the seating.

According to one aspect of the present invention, in a valve of the type referred to having a substantially straight bore of substantially constant cross section, the seating is formed in part by the surface of a lateral opening of substantial taper, the sides of this opening at its widest cross section transverse to the valve bore running substantially tangentially into the cross section of the bore which thereby completes the seating surface. Thus, beyond the tangent points, the longitudinal section of the bore is neither increased nor diminished by the provision of the seating opening and the diaphragm when closed makes substantially line contact with the bore between the tangent points, the diaphragm taking a correspondingly rounded form at its center. Since a valve of the type in question is normally used with the seating tapering downwards, below the tangent points there are no pockets or recesses in which deposits can collect and from which they cannot, or cannot easily, be rodded out, and so prevent closing of the valve; above the tangent points there are slight lateral enlargements of the cross section of the bore, but the form of the surface is such that deposits are unlikely to collect, but if they do, they can easily be rodded out. The line contact between the tangent points (which in practice becomes a narrow strip contact due to the compressibility of the material of the diaphragm) enables a good seal to be made here more easily than would be possible by wide surface contact in this region. Higher up, the seal is made by wide surface contact, but here there is less difficulty and the surface contact has the advantage of distributing the sealing pressure and so reducing wear.

Preferably the valve bore is of substantially circular cross section and the lateral seating opening is a conical figure generated by rotation about an axis perpendicular to and intersecting the axis of the valve bore, of a generator which runs substantially tangentially into the cross section of the valve bore. It is to be understood that the term conical used herein is not confined to a figure having a straight generator but includes any similar tapering figure which will allow the actuator and diaphragm to make the necessary movements without interference. The substantial taper of the seating enables the clamping surface for the margin of the diaphragm to be located laterally beyond one side of the valve bore only by the thickness of the metal necessary for the wall of the bore, thus keeping the height of the valve at a minimum without reducing the height of the bore substantially below the diameter of the full circular cross section. Also although the transverse section of the body is kept at the minimum, there is no loss of cross section of the valve bore. A further advantage of this shape of seating is that the flexing of the diaphragm during opening and closing of the valve is reduced so prolonging its life. In this connection the diaphragm is preferably thickest at its center and tapers in radial section. Also in the open position of the valve, the outer unclamped portion of the diaphragm preferably presents an annular corrugation which is convex towards the valve bonnet. The use of a diaphragm tapering in radial cross section assists in ensuring that the diaphragm forms such a corrugation from the commencement of the opening movement. These features also help to keep the flexing of the diaphragm away from the center where the stresses would be most severe and so contribute to prolonging its life.

A preferred form of the invention will now be described in greater detail with reference to the accompanying drawing, in which.

Figure 1:
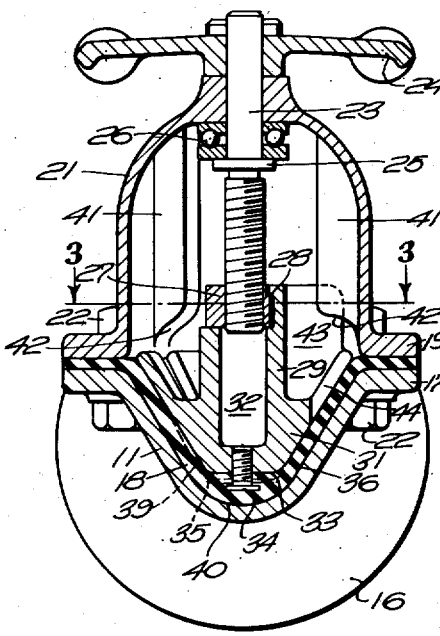
Figure 1 is a transverse sectional elevation taken on the line [A—B] *1—1* in Figure 3 with the valve in closed position.

Referring to the drawing the valve body is formed with a through bore 12 of circular transverse section at its ends which bore in longitudinal section presents a straight bottom 13 whilst the top 14 may slope downwards very slightly from the flanged ends 15, 16 (thus slightly diminishing the circular section while leaving it substantially circular), to a circular opening 10 in the wall of the valve bore surrounded by a flange 17 on which rests with the interposition of the margin of the diaphragm 18, the bottom flange 19 of a valve bonnet 21. The flanges of valve body and bonnet and the diaphragm are clamped together by conventional nuts and bolts 22.

The valve bonnet supports a valve spindle 23 which projects to the outside of the valve bonnet to receive the usual valve operating handle or handwheel 24. On the inside of the valve bonnet the valve spindle is formed with a shoulder 25, a ball thrust bearing 26 being interposed between this shoulder and the end of the valve bonnet so that the valve spindle is free to rotate whilst being prevented from moving longitudinally with respect to the valve bonnet. The inner or lower end of the valve spindle is threaded and is engaged by a shouldered nut 27 which in turn is a loose sliding fit in an undercut transverse groove 28 in the end of a central stem 29 of a conical actuator 31. The section of the groove 28 is such as to prevent the nut 27 from rotating or moving longitudinally with respect to the actuator 31, but to leave the actuator free to centre itself. The stem has a central recess 32 to clear the threaded end of the valve spindle when the valve is open. The actuator 31 is flat at its smaller end 33 to facilitate attachment of the center of the diaphragm by means of a threaded stud 34 the head of which is moulded and vulcanized into the diaphragm which is preferably reinforced at its centre as indicated at 35. The diaphragm is moulded in a form corresponding with the closed position of the valve. It is thicker at its centre which is attached to the actuator and slightly tapers towards its margin which is clamped between the valve body and bonnet.

Figure 2:
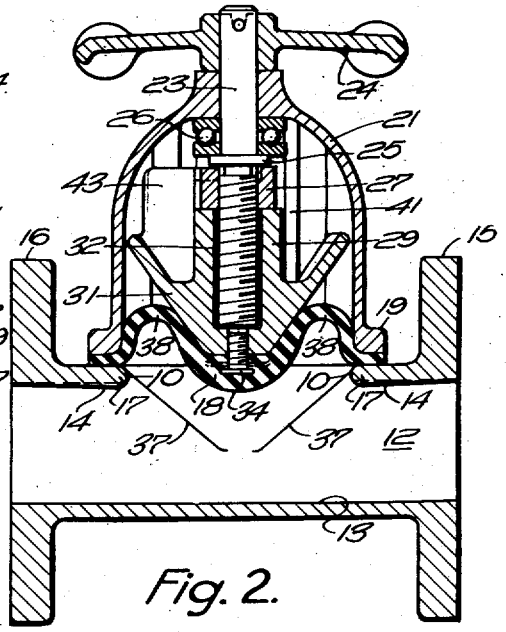
Figure 2 is a longitudinal sectional elevation showing the valve in open position.
Figure 3:
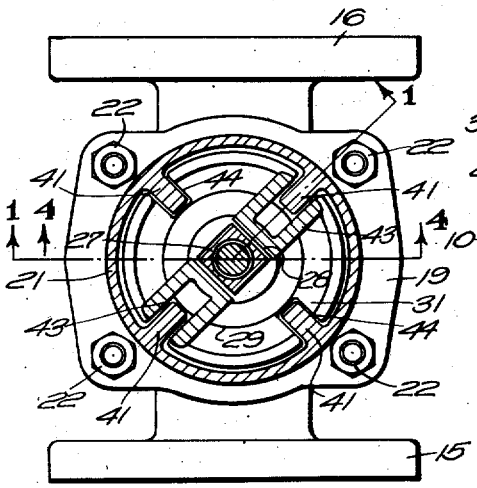
Figure 3 is a horizontal section taken on the line [C—D] *3—3* in Figure 1.
Figure 4:
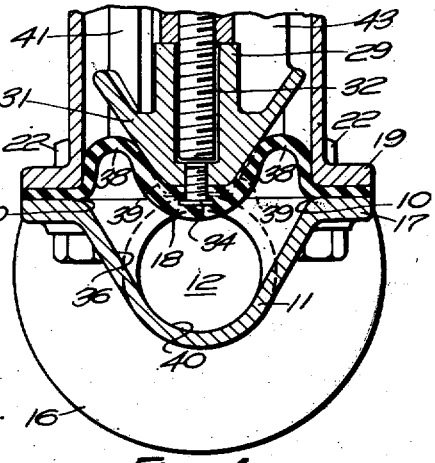
Figure 4 is a transverse sectional elevation taken on the line [A—C] *4—4* in Figure 3 with the valve in open position.

Corresponding to the actuator 31, the valve bore has a conical seating 36 which extends from the circular opening 10 in the wall of the valve bore and the generator of which runs tangentially into the cross section 40 of the valve bore. The form of this seating is clearly shown in transverse section in Figures 1 and 4. At the interpenetration between the conical seating and the cylindrical valve bore (indicated at 37 in Figure 2) the surfaces are rounded off to avoid sharp edges at the boundaries of the central seating area for the diaphragm. With this form of seating and actuator, on opening or closing the valve maximum flexure of the diaphragm takes place near its clamped margin whilst the central portion of the diaphragm remains in contact with actuator, see Figures 2 and 4. In the open position the outer unclamped portion of the diaphragm thus presents an annular corrugation 38 which is convex towards the valve bonnet.

On the side facing the actuator, the diaphragm may be formed with ribs 39 which improve the sealing at this location without however materially stiffening the diaphragm. The inside of the valve bonnet is formed with toes 41 with curved surfaces 42 which assist in supporting the annular corrugation of the diaphragm in the open position and are adapted to be engaged by slots 44 in the actuator to prevent rotation of the latter. Thus there may be four such toes 41 and slots 44 set at 45° to the direction of the principal axis of the valve bore, and the actuator may carry fingers 43 extending upwardly from the conical part of the actuator and along the full length of the stem 29 on each side of two diametrically opposite toes 41, the slot 28 for the nut being at right angles to these fingers 43.

We claim:

[1. A diaphragm valve comprising a body having a bore therethrough of substantially constant cross section throughout at least a substantial part of the bore, a seating in said body comprising a first seating section formed by an arcuate bore surface portion at one side of said bore part, said body being formed with an enlargement having a lateral opening opposing said first seating section, the enlargement including a second seating section formed by a surface tapering inwardly from said lateral opening toward said first seating section and at the ends of said first seating section merging substantially tangentially therewith, a bonnet over said lateral opening secured to said body, a flexible diaphragm sealingly clamped between said body and bonnet around the mouth of said lateral opening, valve operating means carried by said bonnet and including an actuator associated with said diaphragm to move the latter into and out of sealing, seating engagement with said first and second seating sections.]

2. A diaphragm valve for the control of fluids comprising a body having a substantially straight-through bore of substantially constant cross section, a seating in said body comprised of a first seating section formed by an arcuate bore portion at one side of the body, the extent of which first seating section is substantial but less than one-half the peripheral extent of the bore, said body being formed with a lateral opening and a second seating section formed by a wall surface tapering inwardly from said lateral opening and substantially toward said first seating section and merging substantially tangentially with the ends thereof, a bonnet over said lateral opening secured to said body, a flexible diaphragm sealingly clamped between said body and bonnet around the mouth of said lateral opening, valve operating means carried by said bonnet and including an actuator associated with said diaphragm for moving the latter into and out of sealing, seating engagement with said first and second sections.

[3. A diaphragm valve as set forth in claim 2, wherein said diaphragm and said actuator have surfaces contacting with each other and said diaphragm has a surface contacting with said first seating section, and transverse rib means associated with one of the aforesaid contacting surfaces for improving the seating of the diaphragm along the line of seating when the diaphragm is in closed position.]

[4. A diaphragm valve comprising a body having a bore therethrough of substantially uniform cross section, said body being formed with a lateral opening on one side of a lateral plane through the axis of the bore, said body having an internal surface portion extending inwardly from said opening toward the side of the bore on the other side of said plane, a continuous seating in said body comprising an arcuate surface formation on said latter side of the plane and which opposes said opening and a section of said internal surface portion, said formation and section merging smoothly together to form said continuous seating, and the projection of said continuous seating parallel to the axis of said opening falling within said opening, and said arcuate surface formation throughout its length being substantially coincidental with the entire bore surface at said other side of the plane.]

[5. A diaphragm valve as set forth in claim 4 in which the valve bore is of substantially circular cross section and the internal surface portion is a conical figure generated by rotation about an axis perpendicular to and intersecting the axis of the valve bore of a generator which runs tangentially into the cross section of the valve bore.]

6. A diaphragm valve as set forth in claim [5] 2 in which said diaphragm is thickest at its center and tapers in radial section, said actuator being of more rapid taper than the second seating section and said diaphragm having its taper substantially corersponding to the difference in taper between the actuator and seating section.

*7. A diaphragm valve comprising a body having a bore therethrough of substantially uniform cross section, said body being formed with a lateral opening on one side of a lateral plane through the axis of the bore, said body having an internal surface portion extending inwardly with substantial taper from said opening toward the side of the bore on the other side of said plane, a continuous seating in said body comprising an arcuate surface formation on said latter side of the plane, and which opposes said opening and a section of said internal surface portion, said formation and section merging smoothly together to form said continuous seating, said arcuate surface formation throughout its length being substantially coincidental with the entire bore surface at said other side of the plane, a bonnet secured to said body over said opening, an actuator housed in said bonnet and movable along the axis of said opening, a diaphragm having a marginal portion clamped between said body and bonnet around the mouth of said opening, said diaphragm also having an unclamped flexible annular portion bounded by said marginal portion and a thicker center portion secured to said actuator and remaining thereagainst during movement of said actuator to open and close the valve, said center portion occupying substantially less than the entire bore when the valve is closed, said annular portion sealingly engaging said internal body surface portion and forming a conical figure of substantial taper when the actuator is in its closed position, and when the actuator is in its open position said internal body surface portion and said actuator being separated by a substantial gap into which said annular portion is flexed to the form of an annular corrugation which is convex toward the bonnet.*

*8. A diaphragm valve comprising a body having a bore therethrough of substantially uniform cross section, said body being formed with a lateral opening on one side of a lateral plane through the axis of the bore, said body having a continuous seating formed on an internal surface area extending inwardly with substantial taper from said opening toward the side of the bore on the other side of said plane and further formed on an arcuate surface area*

*on the said other side of the plane, said tapering and arcuate areas merging smoothly together, said arcuate surface area comprising a central arcuate seating portion and arcuate portions on either side thereof, each of said arcuate portions throughout its length being substantially coincidental with the entire bore surface at the other side of the plane, said opening being closely adjacent to said bore, a bonnet secured to said body over said opening, an actuator housed in said bonnet movable along the axis of said opening, a diaphragm having a marginal portion clamped between said body and bonnet around the mouth of said opening, said diaphragm also having an unclamped flexible annular portion bounded by said marginal portion and having a thicker center portion secured to said actuator and remaining thereagainst during movement of said actuator to open and close the valve, said center diaphragm portion occupying substantially less than the entire bore when the valve is closed, said annular diaphragm portion sealingly engaging the tapering surface area and forming a conical figure of substantial taper when the actuator is in its closed position, and when the actuator is in its open position said tapering surface area and said*

*actuator being separated by a substantial gap into which said annular diaphragm portion is flexed to the form of an annular corrugation which is convex toward the bonnet.*

References Cited in the file of this patent or the original patent

UNITED STATES PATENTS

| | | |
|---|---|---|
| 57,329 | Jenkins | Aug. 21, 1866 |
| 650,179 | Knox | May 22, 1900 |
| 945,992 | Stevens | Jan. 11, 1910 |
| 1,716,200 | Wilson | June 4, 1929 |
| 2,354,958 | Loweke | Aug. 1, 1944 |
| 2,381,544 | Jacobsen | Aug. 7, 1945 |
| 2,397,373 | Saunders | Mar. 26, 1946 |
| 2,509,143 | Getchell | May 23, 1950 |

FOREIGN PATENTS

| | | |
|---|---|---|
| 437,463 | Great Britain | 1935 |
| 785,393 | France | 1935 |
| 527,917 | Great Britain | 1940 |
| 882,556 | France | 1943 |
| 921,432 | France | 1947 |